A. GLEICHEN.
TORIC SPECTACLE LENS.
APPLICATION FILED APR. 5, 1921.
1,438,820.
Patented Dec. 12, 1922.
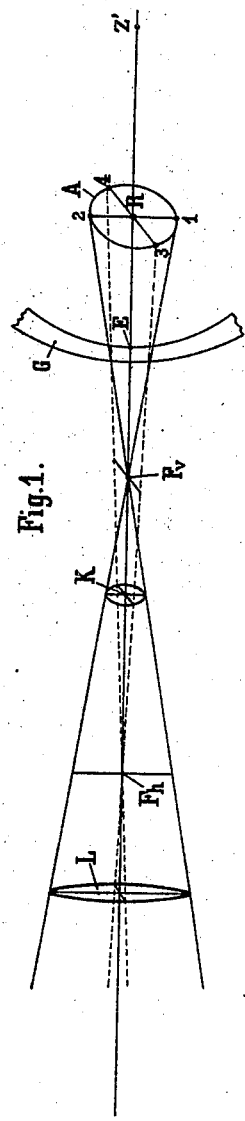
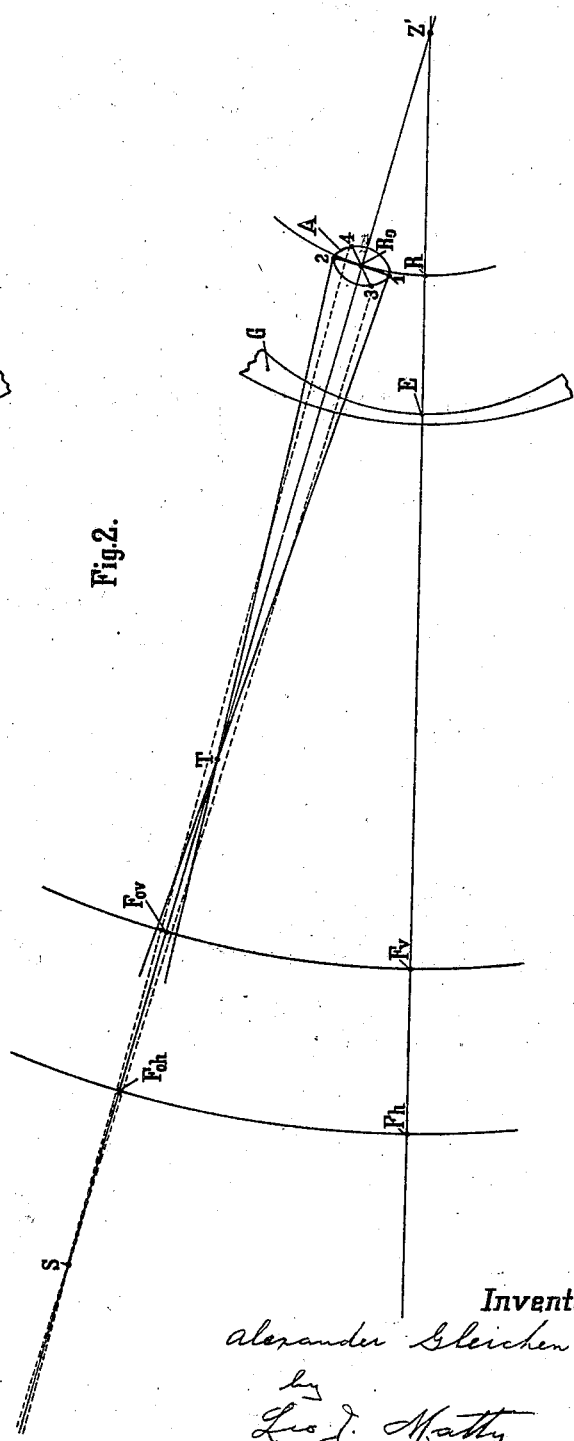
Inventor:
Alexander Gleichen Patented Dec. 12, 1922.

1,438,820

UNITED STATES PATENT OFFICE.

ALEXANDER GLEICHEN, OF BERLIN, GERMANY, ASSIGNOR TO THE FIRM OPTISCHE ANSTALT C. P. GOERZ AKTIENGESELLSCHAFT, OF FRIEDENAU, NEAR BERLIN, GERMANY.

TORIC SPECTACLE LENS.

Application filed April 5, 1921. Serial No. 458,869.

*To all whom it may concern:*

Be it known that I, Dr. ALEXANDER GLEICHEN, citizen of the German Republic, residing at Berlin, Germany, have invented certain new and useful Improvements in Toric Spectacle Lenses (for which applications have been filed for Letters Patent in the following countries: Germany, filed March 17, 1919; France, filed June 19, 1920; Italy, filed June 23, 1920; Great Britain, filed June 23, 1920; Japan, filed August 28, 1920), of which the following is a specification.

This invention relates to toric spectacle lenses of the kind with two planes of symmetry and to lenses with two toric surfaces as well as to lenses with one spherical and one toric surface.

When by means of such a lens an astigmatic eye is fully corrected along the optical axis, a reduction in the sharpness of vision is nevertheless generally noticeable in oblique directions with the eye rolling. This results in the appearance of dispersion or divergence figures on the retina, which are formed by the injurious astigmatism of the pencils of rays refracted with a strong inclination to the axis. A clear and satisfactory vision is affected not only by the size of the said dispersion or divergence figures, but also by the different shape of the same in the meridional section and in the equatorial section of the lens. When this shape considerably differs in the two main sections, the eye will find different conditions of vision changing very quickly and will be forced to adapt itself constantly to these changing conditions. In order to avoid as much as possible this expenditure of energy which is very bad for the eye, the small degree of the dimness in the two main sections which cannot be completely eliminated, is made, according to this invention, of uniform character.

As will be described hereinafter, this is attained by arranging that for pencils of rays of medium inclination which intersect each other in the same point of the axis about 25 mm. behind the apex of the lens on the eye side and of which one pencil travels in the meridional section, and the other in the equatorial section, the circles of least confusion are situated on a sphere which is drawn about the above mentioned point of intersection of the main rays.

Figures 1 and 2 each show the path of a pencil of rays in a vertical plane through a toric lens which is assumed to co-incide with the meridional section through said lens, Fig. 1 showing the path of a pencil the axis of which is co-inciding with the axis of the lens, whereas Fig. 2 shows a pencil with oblique incidence. The equatorial section through the lens is assumed to be a horizontal section through the lens when in operative position before a human eye, said equatorial section being at right angles to the vertical section and to the plane of the paper of the drawing.

The refractive powers or apex refractions have the values $D_v$ and $D_h$, in these two sections, the indexes "v" and "h" standing for the words "vertical" and "horizontal." The two foci $F_v$ and $F_h$ are accordingly situated in the optical axis.

Figure 1 shows the path of the rays in a toric glass with negative apex refractions, such as are used therefore for correcting myopia or short sight, together with the human eye; and by way of example it is assumed that it is question of a lens for viewing distant objects.

The lens itself is shown diagrammatically in vertical section and marked G. Its apex at the eye side is E. The point $Z^1$ is assumed to represent the centre of rotation of the eye. If a pencil of rays parallel to the axis (not shown in the figure) strikes the lens, it will be refracted and will strike the pupil A of the eye (or strictly speaking the entrance pupil of the eye). In this way the pencil is given at this point a circular cross-section with the centre R.

As is well known, the pencil is so refracted as to produce a virtual Sturm's conoid, with the foci $F_v$ and $F_h$ for the vertical and the horizontal section. All the rays of the pencil pass, as is known, through two foci situated at $F_v$ and $F_h$, which are at right angles both to the optical axis and to each other. As is well known, the cross-sections of the Sturm pencil, apart from those at the foci mentioned, are generally ellipses (for instance L in Fig. 1); at one point between the two foci there is however a circular cross-section with the centre at K in Fig. 1, which is described in the literature of the art as the "circle of smallest confusion." A second circular cross-section of the pencil is the already mentioned pupil of the eye with the centre R.

From the well known properties of Sturm's conoid it can be easily deduced that the two astigmatic foci and the centres of the two circular pencil cross-sections, and therefore the four points $F_v$, $F_h$, R, and K are four harmonic points, a proposition which, as can be easily proved, applies generally to every infinitely thin astigmatic pencil of rays.

If therefore $F_vR=p_v$, $F_hR=p_h$, $KR=p$ then there will be the relation:

$$(1) \quad \frac{1}{p_v}+\frac{1}{p_h}=\frac{2}{p}$$

When the toric lens in question is the correcting distant lens of the astigmatic eye, the points $F_v$ and $F_h$ must, as is well known, coincide with the astigmatic far points of the eye, so that $F_v$ and $F_h$ are conjugated with the retina point, relatively to the refracting system of the astigmatic eye, in which the optical axis intersects the retina.

When the eye rolls about the centre $Z'$ situated about 10 mm. behind R, the points $F_v$ and $F_h$ will each describe a spherical surface which is described as the astigmatic far points sphere. In the same way, the point K also describes a sphere. The joint centre of these three spheres is the pivot point $Z'$, and their radii are $Z'F_v$, $Z'F_h$ and $Z'K$.

As the axis of the eye now assumes an oblique position relatively to the optical axis of the lens, the pencils of rays arriving in the eye, no longer travel in the direction of the optical axis of the toric lens, but pass through the latter in an oblique direction. The form of the astigmatic pencils produced thereby, deviates, it is true, from the Sturm's conoid, in as far as the ray combination in the meridional and sagittal pencil components are no longer of the same magnitude, and the astigmatic focal lines are no longer both at right angles to the axis of the pencil, but as regards the shape of the cross-section, the conditions are quite similar to those in the Sturm's conoid.

Of the various pencils which during the rolling of the eye, can pass into the pupil, there will first be examined only those which, on the one hand in vertical section, and on the other hand in horizontal section, travel at an average angle of about 30° to the axis, and intersect each other at the same point of the axis $Z'$ about 25 mm. behind the apex of the lens on the eye side. These two pairs of pencils will be in the following referred to shortly as "oblique pencils." If such a virtually astigmatic pencil of rays coming out of the toric lens is considered, the two astigmatic far points will be situated on the same, namely at the point where the pencil axis intersects the two far point spheres. But the foci of the virtual pencil will not now coincide exactly with these far points, as the pencils passing through the spectacle lens in oblique direction will have an injurious astigmatism. This injurious astigmatism reduces the sharpness of vision for the corresponding direction of looking, and is to be rendered by the invention as harmless as possible.

Fig. 2 shows a pencil with oblique incidence in vertical section.

Here again $F_h$, $F_v$, $Z'$ is the optical axis of the toric lens G which however is only diagrammatically indicated in vertical section. The centre R of the pupil of the eye however, owing to the rolling of the eye, has now reached the point $R_o$, and the straight line $Z'R_o$ represents the axis of the virtual astigmatic pencil of rays which, after refraction by the toric lens, strikes the eye. This axis intersects the astigmatic far points spheres at the points $F_{oh}$ and $F_{ov}$ which correspond to the points $F_h$ and $F_v$ on the optical axis. Let the meridional and sagittal focus of the pencil be represented by the points T and S. If these coincided with the points $F_{ov}$ and $F_{oh}$, the astigmatism on the oblique pencil would be equal to that on the optical axis, and no reduction of the sharpness of vision would take place. As however these points do not coincide, the $F_v$ sphere will be intersected at $F_{ov}$ by the meridional pencil portion coming from the edge points 1 and 2 of the pupil in a dispersion or divergent line, the length of which will be called $l_{tv}$ where therefore the index "t" refers to the meridional pencil portion, and the index "v" to the fact that it belongs to the vertical section. In a similar way, the sagittal pencil portion coming from the points 3 and 4 will intersect at $F_{oh}$ the $F_h$ sphere in a dispersion or divergent line which will be called $l_{sv}$. Making in Fig. 2

$TR_o=t_{ov}$, $SR_o=s_{ov}$ and as before $$F_{ov}R_o=F_vR=p_v$$
$$F_{oh}R_o=F_hR=p_h$$

and designating the diameter of the pupil, to be considered as being circular, by $Zr_o$ there exists a simple proportion:

$$\frac{l_{tv}}{Zr_o}=\frac{p_v-t_{ov}}{t_{ov}}$$

or when $$\frac{l_{tv}}{p_v}=\epsilon_{tv}$$

then $$(2) \quad \epsilon_{tv}=Zr_o\left(\frac{1}{t_{ov}}-\frac{1}{p_v}\right)$$

In the same way will be obtained for the sagittal portion of the pencil extending in the vertical section $$(3) \quad \epsilon_{sv}=Zr_o\left(\frac{1}{p_h}-\frac{1}{s_{ov}}\right)$$

Similar considerations could be made for the pencils traveling in the horizontal section. Using the index "h" in order to indicate that it belongs to the horizontal section, there is for the meridional portion the relation:

$$(4) \quad \frac{1_{th}}{p_h} = \epsilon_{th} = Zr_o \left( \frac{1}{p_h} - \frac{1}{t_{oh}} \right)$$

and for the sagittal portion:

$$(5) \quad \frac{1_{sh}}{p_v} = \epsilon_{sh} = Zr_o \left( \frac{1}{s_{oh}} - \frac{1}{p_v} \right)$$

in which $t_{oh}$ and $s_{oh}$ are the distances of the meridional and sagittal point of image from the centre $R_o$ of the pupil of the eye.

It may be pointed out that the values $\epsilon_{tv}$, $\epsilon_{sv}$, $\epsilon_{th}$ and $\epsilon_{sh}$ represent the angles at which the dispersion or divergent lines $1_{tv}$, $1_{sv}$, $1_{th}$ and $1_{sh}$ are seen from the centre of the pupil of the eye. As these dispersion lines are situated on the astigmatic far point spheres, that is to say are conjugated with the point of retina (fovea), they can be reproduced sharply on the retina.

In view of the comparatively small focal distances of the eye, which also in the astigmatic main sections deviate from each other only comparatively little, and in view of the fact that the retina is always situated comparatively close to the focal plane of the eye, the corresponding retina images may be taken as being proportional to the said angles $\epsilon_{tv}$, $\epsilon_{sv}$, $\epsilon_{th}$ and $\epsilon_{sh}$ and as the proportionality constant can be used in the first approximation the average value of the front focal distance of the diagrammatic eye which is called $f_o$. Designating the retina images of the above mentioned dispersion lines for the pencil in the vertical section with $\psi_t$ and $\psi_s$, and for the pencil in the horizontal section $\mu_t$ and $\mu_s$, then $$(6) \quad \psi_t = f_o \epsilon_{tv} \quad \psi_s = f_o \epsilon_{sv}$$
$$\mu_s = f_o \epsilon_{sh} \quad \mu_t = f_o \epsilon_{th}$$

The values $\psi_t$ and $\psi_s$ can be therefore considered as the two axes of the generally elliptical dispersion circle on the retina, which is produced by the pencil travelling in the vertical section. The values $\mu_s$ and $\mu_t$ have analogous meaning for the pencil in the horizontal section:

From the equations 2 to 6, it follows:

$$(7) \quad \psi_t - \psi_s = f_o(\epsilon_{tv} - \epsilon_{sv}) = Zr_o f_o \left( \frac{1}{t_{ov}} + \frac{1}{s_{ov}} - \frac{1}{p_v} - \frac{1}{p_h} \right)$$

$$(8) \quad \mu_s - \mu_t = f_o(\epsilon_{sh} - \epsilon_{th}) = Zr_o f_o \left( \frac{1}{t_{oh}} + \frac{1}{s_{oh}} - \frac{1}{p_v} - \frac{1}{p_h} \right)$$

In a toric spectacle lens when it is limited by two toric surfaces, there are available first four different radii as constructional elements, as the thickness of the lens need not be considered as an efficacious means for correcting the path of rays. As however generally the refractive powers (or the apex refractions) $D_v$ and $D_h$ are prescribed in the two main sections, only two radii are available. If the lens is limited at one side by a spherical surface, as is almost exclusively the case in practice, only one free constructional element remains available.

The dispersion circles on the retina for the obliquely falling pencils of rays cannot be made to disappear by means of a toric lens, for this would necessitate that the four values $\psi_t$ $\psi_s$ $\mu_s$ and $\mu_t$ should simultaneously become zero. As has been seen in the foregoing, four conditions cannot be however fulfilled with a simple toric spectacle lens of small thickness.

It is necessary therefore that the dispersion figures should be circles both in the oblique pencil of the vertical section, and in that in the horizontal section. Astigmatism does not however appear then as such on the retina, namely as a phenomenon of want of symmetry, and the remaining dimness is uniform, and of the kind such as produced by spherical dispersion figures.

The condition for the same is $$(9) \quad \psi_t = \psi_s \text{ and } \mu_s = \mu_t$$

or, in accordance with the equations 7 and 8, and with due regard to the equation 1

$$(10) \quad \frac{1}{t_{ov}} + \frac{1}{s_{ov}} = \frac{2}{p}$$
$$\frac{1}{t_{oh}} + \frac{1}{s_{oh}} = \frac{2}{p}$$

If the distance of the circle of smallest confusion from the centre $R_o$ of the pupil in the oblique pencils of the vertical and horizontal sections is designated respectively with $p_v^o$ and $p_h^o$, then in accordance with the above mentioned proposition, for each astigmatic pencil penetrating into the eye, the centre of the circle of smallest confusion, the centre of the pupil and the astigmatic image points are harmonic points $$(11) \quad \frac{1}{t_{ov}} + \frac{1}{s_{ov}} = \frac{2}{p^o_v} \text{ and } \frac{1}{t_{oh}} + \frac{1}{s_{oh}} = \frac{2}{p^o_h}$$

From the latter equations follows:

$$(12) \quad p^o_v = p^o_h = p$$

The condition required in order that the dispersion figures of the corresponding oblique pencils on the retina should be circles, is that the centres of the circles of smallest confusion of the axis pencil and of the oblique pencils, should be situated on one and the same sphere, the centre of which is the point of intersection of the main rays (centre of rotation of the eye).

As in the present case only two conditions have to be fulfilled, this can be done by means of a toric lens, both faces of which are toric surfaces.

In practice however toric lenses with one spheric surface, the so-called toro-spheric or sphero-toric glasses, are of special importance, but in their case, as already stated, only a single free constructional element is available.

It is true that in this case it is no longer possible to make the dispersion figures circular in accordance with the equations 7 and 8, as this would require two conditions to be fulfilled; but in the two oblique pencils the deviation from the circular shape, which is expressed by the difference of the transverse diameters of the dispersion figures, namely by the values $\psi_t - \psi_s$ and $\mu_s - \mu_t$ can be made equal to each other. In this case there is a uniform want of clearness in the two main sections.

The condition for the above is therefore

(13) $\psi_t - \psi_s = \mu_s - \mu_t$ or in accordance with the equations 7 and 8

(14) $\dfrac{1}{t_{ov}} + \dfrac{1}{s_{ov}} = \dfrac{1}{t_{oh}} + \dfrac{1}{s_{oh}}$ But in accordance with the equation 11, the last proportion is identical with the condition $p_v = p_h$ For producing a uniform want of clearness in the two oblique pencils, the centres of the dispersion circles of the said two pencils must be therefore situated on a sphere, the centre of which is in the point of intersection of the main rays (centre of rotation of the eye).

It goes without saying that the results obtained are valid also for positive lenses with real astigmatic image points.

It must be further pointed out that in accordance with the usual definition, the sharpness of vision is in the inverse ratio to the physiological limit angle when the latter is expressed in angle minutes. In the present case however the angles $\varepsilon_{tv}$, $\varepsilon_{sv}$, $\varepsilon_{th}$, and $\varepsilon_{sh}$ are identical with the said limit angles; their reciprocal values supply therefore direct a measure for the sharpness of vision in the meridional and sagittal portion of the two oblique pencils.

In the following is given by way of example a construction, namely for a negative toro-spheric lens. The front radii of the torus in the vertical and horizontal section are marked $r_{1v}$ and $r_{1h}$, and the rear radius of the sphere with $r_2$. As the measure of length is used the meter. The refractive index is $n = 1.52$. The point of intersection of the main rays is 0.025 m. behind the lens apex at the side of the eye. Further $D_v = -8$ dptr.  $D_h = -4$ dptr.
$r_{1v} = 0.56843$
$r_{1h} = 0.10613$
$r_2 = 0.058325$ Thickness $d = 0.001$.

The sections or lengths shown in Fig. 2, are all taken in the following as being positive. With an inclination of the main rays at the side of the eye of 30°, $t_{ov} = 0.132104$   $\dfrac{1}{t_{ov}} = 7.5698$ $s_{ov} = 0.301159$   $\dfrac{1}{s_{ov}} = 3.3205$ $t_{oh} = 0.26950$    $\dfrac{1}{t_{oh}} = 3.7106$ $s_{oh} = 0.139162$   $\dfrac{1}{s_{oh}} = 7.1859$ in accordance with the equation 11, $p°_v = \dfrac{2}{\dfrac{1}{t_{ov}} + \dfrac{1}{s_{oh}}} = 0.183646$ $p°_h = \dfrac{2}{\dfrac{1}{t_{oh}} + \dfrac{1}{s_{oh}}} = 0.183544$ The centres of the circles of smallest confusion are therefore situated practically on one and the same sphere drawn about the point Z′, for the difference of their distances from the point Z′ amounts only to $p°_v - p°_h = 0.00010 \text{m} = \dfrac{1}{10} \text{mm}.$ Further, the $\varepsilon$ values in angular seconds will be $\varepsilon_{sv} = 374''$, $\varepsilon_{tv} = 352''$; $\varepsilon_{sh} = 36''$, $\varepsilon_{th} = 52''$ which as already stated are in inverse ratio to the sharpness of vision in the pencil components in question. These sharpnesses of vision themselves would be obtained by dividing the figure 60 by the above figures for $\varepsilon_{sv}$, $\varepsilon_{tv}$, $\varepsilon_{sh}$ and $\varepsilon_{th}$. These values lead to a more favorable result than is the case with well known lenses of the same axial refractive powers; more particularly the extraordinarily favorable correction must be mentioned in the specially important horizontal section in which the sharpness of vision still considerably exceeds the unit.

What I claim is:

1. A spectacle lens with at least one toric surface and two planes of symmetry having such radii of curvature that the circle of least confusion for a pencil of mean obliquity in one of said planes of symmetry which intersects the axis of the lens at a distance of about 25 mm. behind the lens has the same distance from this point of intersection as the circle of least confusion of a pencil which at the same obliquity as that of the first named pencil is passing in the second plane of symmetry and intersects the axis likewise at the above mentioned point.

2. A spectacle lens with two toric surfaces and two planes of symmetry having such radii of curvature that the circle of least confusion for a pencil of mean obliquity in one of said planes of symmetry which intersects the axis of the lens at a distance of about 25 mm. behind the lens has the same distance from this point of intersection as the circle of least confusion of a pencil which at the same obliquity as that of the first named pencil is passing in the second plane of symmetry and intersects the axis likewise at the above mentioned point, the distance of the circles of least confusion for the said two pencils of same mean obliquity being at the same time equal to the distance of the circle of least confusion on the axis of the lens from the said point lying about 25 mm. behind the lens.

In testimony whereof I have signed this specification in the presence of two subscribing witnesses.

Dr. ALEXANDER GLEICHEN.

Witnesses:
    Max Fashner,
    Jak Bernath.